United States Patent [19]

Abolins et al.

[11] 4,373,052

[45] Feb. 8, 1983

[54] POLYPHENYLENE ETHER COMPOSITIONS

[75] Inventors: Visvaldis Abolins; Bruce A. Luxon, both of Delmar, N.Y.

[73] Assignee: General Electric Company, Pittsfield, Mass.

[21] Appl. No.: 304,947

[22] Filed: Sep. 23, 1981

[51] Int. Cl.$^3$ ............................................. C08K 3/34
[52] U.S. Cl. ..................................... 524/451; 528/212
[58] Field of Search ..................... 260/37 R, 45.7 R; 528/212; 524/451

[56] References Cited

U.S. PATENT DOCUMENTS

| | | | |
|---|---|---|---|
| 3,257,357 | 6/1966 | Stamatoff | 260/47 |
| 3,257,358 | 6/1966 | Stamatoff | 260/47 |
| 3,306,874 | 2/1967 | Hay | 260/47 |
| 3,306,875 | 2/1967 | Hay | 260/47 |
| 3,383,435 | 5/1968 | Cizek | 260/874 |
| 3,642,699 | 2/1972 | Cooper et al. | 260/47 |
| 3,733,299 | 5/1973 | Cooper et al. | 260/47 |
| 3,838,102 | 9/1974 | Bennett et al. | 260/47 |
| 4,166,812 | 9/1979 | Lee, Jr. | 260/37 R |

OTHER PUBLICATIONS

The Condensed Chemical Dictionary, pp. 1060-1061, 5th Edition, Reinhold Publ. Co., New York, 1956.

Primary Examiner—Melvyn I. Marquis
Attorney, Agent, or Firm—Hedman, Casella, Gibson & Costigan

[57] ABSTRACT

Improved polyphenylene ether compositions are described. These compositions contain an amount of talc filler effective to provide an UL arc tracking rate of less than 1 inch/minute. Improvement in the impact strength and other physical properties of these compositions may be obtained through incorporation of low molecular weight terblock copolymer having polystyrene endblocks and a rubber midblock.

13 Claims, No Drawings

POLYPHENYLENE ETHER COMPOSITIONS

BACKGROUND OF THE INVENTION

The Term "polyphenylene ether resin" is well known as defining a class of thermoplastic materials which possess outstanding physical properties, including hydrolytic stability, dimensional stability and excellent dielectric characteristics. Methods of preparation are known in the art and described in the patent literature, e.g., Hay, U.S. Pat. Nos. 3,306,874, and 3,306,875 and Stamatoff, U.S. Pat. Nos. 3,257,357 and 3,257,358, incorporated herein by reference to save unnecessary detail. Other patents which show the preparation of polyphenylene ether resins include Bennett and Cooper, U.S. Pat. Nos. 3,639,656 and 3,838,102, as well as Cooper and Bennett, U.S. Pat. Nos. 3,642,699, and 3,733,299, also incorporated herein by reference.

It is known that when the polyphenylene ether resins are combined with styrene resins, the resulting compositions possess properties which are improved over the corresponding properties of either resin alone. See Cizek, U.S. Pat. No. 3,383,435, the disclosure of which is incorporated herein by reference.

A shortcoming of these thermoplastic materials is their relatively poor resistance to electrical arcing. Such arcing is most conveniently quantized by the related parameter of tracking (often referred to as "arc tracking") resistance. It measures, for example, the ability of the thermoplastic composition to withstand extreme electrical stresses through the rate of formation of a carbonized path or track as two charged electrodes are drawn apart on its surface.

A standard means for measurement of arc/tracking resistance is described in the UL test procedure entitled "High Voltage Arc/Tracking Rate". Desirably, rates for thermoplastic compositions in accordance with such procedure are less than 1 inch/minute. More desirably, a rate of less than 1 inch/5 minutes is obtained.

It is known that the arc/tracking resistance of certain polymeric compositions may be improved through the incorporation of mineral fillers. Even for polyphenylene ether compositions containing in excess of 30% filler by weight, however, desirable arc/tracking rates have not been obtained. As a result, the utility of this important class of compositions has been restricted.

Introduction to the Invention

The present invention involves the discovery that talc, employed as a filler for a polyphenylene ether composition, provides a significant improvement in UL arc tracking rate. Talc, desirably in an amount of at least about 45% by total composition weight, readily produces a rate of less than 1 inch/minute.

In a preferred embodiment, the present invention involves the provision of certain styrene resins in the filled polyphenylene ether composition. It has further been discovered that low molecular weight terblock copolymer with polystyrene endblocks and a rubber midblock maintain reduced arc/tracking rates while improving the impact strength and other physical properties of the present compositions. Terblock copolymers having an average molecular weight of less than about 100,000 are significantly more effective in this regard than alternative styrene resins.

DESCRIPTION OF THE INVENTION

While any polyphenylene ether resin may be employed in the compositions of the present invention, preferred are homo- and copolymeric resins having the formula:

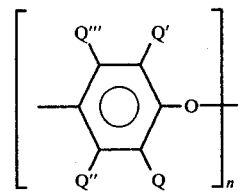

wherein the oxygen ether atom of one unit is connected to the benezene nucleus of the next adjoining unit, n represents the number of monomer units and is a positive integer of at least 50, e.g., from 50 to about 200, and Q, Q', Q" and Q"' are independently selected from the group consisting of hydrogen, halogen, hydrocarbon radicals free of a tertiary alpha-carbon atom, halohydrocarbon radicals having at least two carbon atoms between the halogen atom and the phenyl nucleus, hydrocarbonoxy radicals and halohydrocarbonoxy radicals having at least two carbon atoms between the halogen atom and the phenyl nucleus.

Still more preferably, within the above formula Q and Q' are alkyl, especially alkyl having from 1 to 4 carbon atoms. Illustratively, such resins include poly(2,6-dimethyl-1,4-phenylene)ether; poly(2,6-diethyl-1,4-phenylene)ether; poly(2-methyl-6-ethyl-phenylene)ether; poly(2-methyl-6-propyl-1,4-phenylene)ether; poly(2,6-dipropyl-phenylene)ether; poly(2-ethyl-6-propyl-1,4-phenylene)ether; and the like.

Especially preferred is poly(2,6-dimethyl-1,4-phenylene)ether, preferably having an intrinsic viscosity of from about 0.4 to 0.8, more preferably about 0.45 deciliters per gram (dl/g.) measured in solution in chloroform at 30° C.

These compositions also desirably contain styrene resin to improve their physical properties. The styrene resins are those having at least 25% by weight of repeating units derived from a vinyl aromatic compound of the formula:

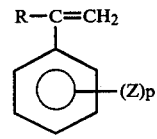

wherein R is hydrogen, (lower)alkyl or halogen; Z is vinyl, halogen or (lower)alkyl; and p is 0 or an integer for from 1 to the number of replaceable hydrogen atoms on the benzene nucleus. Herein, the term "(lower)alkyl" means alkyl of from 1 to 6 carbon atoms.

The term "styrene resin" as used broadly throughout this disclosure includes, by way of example, homopolymers such as polystyrene and polychlorostyrene, as well as polystyrenes which have been modified by natural or synthetic rubber, e.g., polybutadiene, polyisoprene, butyl rubber, EPDM rubber, ethylene propylene copolymers, natural rubber, polysulfide rubbers, polyurethane rubbers, epichlorohydrin, and the like; styrene containing copolymers such as the styrene-acrylonitrile copolymers (SAN) styrene-butadiene copolymers, styrene-maleic anhydride copolymers, styrene-acrylonitrile-butadiene terpolymers (ABS), poly-alphamethylstyrene, copolymers of ethylvinylbenzene and divinylbenzene, and the like; block copolymers of the A-B-A and A-B type wherein A is polystyrene and B is an elastomeric diene, e.g., polybutadiene, radial teleblock copolymers of styrene and a conjugated diene, acrylic resin modified styrenebutadiene resins and the like, and blends of homopolystyrene and copolymers of the aforementioned types.

The styrene resin may be present in any amount. Widely divergent proportions of from 1:99 to 99:1 by weight of polyphenylene ether resin are known. More desirably the respective styrene and polyphenylene ether resins are in a weight ratio of from about 2:1 to 1:20, most preferably about 1:4, for use in the present compositions.

The UL arc/tracking rate of these thermoplastic compositions may be reduced to a desirably level solely through the incorporation of talc filler. An amount of talc effective to provide a UL tracking rate (as measured by the above referenced standard test procedure) of less than 1 inch/minute, more desirably less than 1 inch/5 minutes, should be utilized.

This amount of talc filler necessary to achieve these rates may vary, dependent upon the other ingredients of a given composition. Ordinarily, however, at least about 45%, preferably from 45 to 60%, talc by composition weight is utilized.

Any talc filler may be employed in accordance with the present invention. Desirably, however, this talc has a particle size essentially within the range of from 1 to 40μ in average dimension, and especially about 9μ. This ensures optimum distribution and homogeneous tracking resistance throughout the present composition.

A drawback of these highly-filled polyphenylene ether compositions is a trend towards deterioration in their physical properties. This drawback has been found to reach substantial proportions at a filler content of about 30%, more particularly 45%, by composition weight. The presence of styrene resin, especially rubber-modified high impact polystyrene, may mitigate this drawback. Notwithstanding this mitigation, however, the deterioration may curtail the desirability of these compositions for important applications.

It has been discovered that certain low molecular weight terblock copolymers having styrene endblocks and rubber midblocks are unexpectedly effective in improving the physical properties of these highly-filled polyphenylene ether compositions. As compared to other styrene resins, these copolymers may provide significantly improved impact strengths. They may also lower the flexural modulus of a molded composition so as to yield more ductile parts with little loss of tensile or flexual strengths. Further, attendant decreases in viscosity reduce channel flow and permit a molded part to be filled more easily at lower molding temperature. This facilitates processing of the compositions.

The terblock copolymers of this embodiment must be of low molecular weight. The advantages of this aspect of the present invention do not arise at copolymer weights greater than about 100,000. Preferably, these copolymers have a molecular weight of from 30,000 to 80,000.

For these terblock copolymers, the styrene endblocks may be formed from any of the monomers already described in connection with styrene resins.

The midblocks of these copolymers are ordinarily prepared from butadiene, although any conjugated divinyl monomer may be employed. In addition, the midblock preferably contains monovinyl component, copolymers of ethylene being especially desirable.

The midblocks of the terblock copolymer are also desirably at least partially saturated. This may readily be accomplished by catalytic hydrogenation of the terblock copolymer. Hydrogenation to less than 10% of the initial degree of unsaturation of the copolymer is particularly preferred.

The proportions of different monomers in the terblock copolymer may range widely. In general, however, a weight ratio of styrene (endblock) to rubber (midblock) of about 30:70, respectively, in the copolymer is preferred.

The amount of terblock copolymer in the present highly-filled compositions may range widely. Ordinarily, however, from 5 to 25% copolymer by composition weight is employed. Where an amount within this range is employed, other styrene resin may also be present to yield a total styrene resin to polyphenylene ether weight ratio as described above.

Other ingredients can also be included within the present compositions for their conventional purposes. These include drip retardants, fire retardants, odor retardants, plasticizers, antioxidants, stabilizers, reinforcing agents, pigments, dyes, processing aids, and the like.

The manner in which the present compositions are prepared is not critical. In one procedure, a blend premix is formed by tumbling the ingredients. The blend premix is passed through an extruder at an elevated temperature, e.g., from about 300° to about 400° C., dependent on the needs of the particular composition. The extrudate is cooled and chopped into pellets and the pellets are molded into any desired shape.

The following examples are given by way of illustration only and are not intended as a limitation on the scope of this invention. Many variations are possible without departing from its spirit and scope. Unless otherwise specified herein, all proportions are provided on a weight basis.

EXAMPLE 1

Five thermoplastic compositions are prepared by tumbling 50 parts of polyphenylene ether (poly(2,6-dimethyl-1,4-polyphenylene)ether); 50 parts of high impact polystyrene (6H6 polystyrene produced by Amoco Oil Company); and 5 parts of triphenylphosphate plasticizer/fire retardant with 55, 75 or 95 parts of talc (EMTAL 500 produced by Englehard Mineral and Chemicals Co.), 95 parts of clay or 95 parts of titanium dioxide as fillers therefor.

The resultant sample compositions are separately passed through an extruder at about 350° C. The extrudants are chopped into pellets and molded at an injection temperature of about 300° C. and mold temperature of 80° C. to produce sample articles.

These molded articles are then tested for their comparative physical properties to obtain the data in Table I.

TABLE I

|                              | A         | B         | C         | D         | E       |
|------------------------------|-----------|-----------|-----------|-----------|---------|
| COMPOSITION (Filler)         |           |           |           |           |         |
| Talc                         | 34.4%     | 41.7%     | 47.5%     | —         | —       |
| Clay                         | —         | —         | —         | 47.5%     | —       |
| Titanium Dioxide             | —         | —         | —         | —         | 47.5%   |
| PROPERTIES (2.5 inch test specimens) |   |           |           |           |         |
| Tensile Strength (psi)       | 9,700     | 8,800     | 7,800     | 8,500     | 9,400   |
| Flexural Strength (psi)      | 16,000    | 16,000    | 15,000    | 16,500    | 16,700  |
| Flexural Modulus (psi)       | 914,000   | 1,117,000 | 2,297,000 | 1,183,000 | 727,000 |
| Izod Impact Strength (ft.lb./in.n.) | 0.4 | 0.5    | 0.5       | 0.5       | 1.0     |
| Deflection Temperature Under Load (°F.) | 250° | 242° | 247° | 243° | 243° |
| ARC Tracking Rate (inch./min.) | 9.2     | 8.8       | 0.12      | 4.3       | 6.0     |

The data shows the importance of a relatively high concentration of talc. Samples A and B show totally inadequate tracking rates and little change in that rate over their talc concentration differential. Notwithstanding those facts, the rate drops dramatically for Sample C, a composition within the scope of the present invention.

In comparison to this desirable and unexpected reduction in tracking, the remaining physical measurements reveal only minor, more linear changes in physical properties with increasing concentrations of talc filler.

Turning to Samples D and E underscores the importance of the present talc fillers. These other clay and titanium dioxide fillers simply do not produce the desired reduction in arc tracking rate.

EXAMPLE 2

Five thermoplastic compositions are prepared by tumbling 80 parts of polyphenylene ether; 5 parts of high impact polystyrene (Kraton "G" 1651 terblock copolymer produced by Shell Oil Co.); and 20 parts of triphenylphosphate fire retardant with 55, 75 and 95 parts of talc (EMTAL 500), 95 parts of clay or 95 parts of titanium dioxide as fillers therefor.

The samples are then processed into molded articles and tested as set forth in Example 1. The results are as follows:

TABLE 2

|                              | F         | G         | H         | I         | J       |
|------------------------------|-----------|-----------|-----------|-----------|---------|
| COMPOSITION (Filler)         |           |           |           |           |         |
| Talc                         | 34.4%     | 41.7%     | 47.5%     | —         | —       |
| Clay                         | —         | —         | —         | 47.5%     | —       |
| Titanium Dioxide             | —         | —         | —         | —         | 47.5%   |
| PROPERTIES (2.5 inch test specimens) |   |           |           |           |         |
| Tensile Strength (psi)       | 10,500    | 10,000    | 9,300     | 10,700    | 9,500   |
| Flexural Strength (psi)      | 17,300    | 16,300    | 15,200    | 16,500    | 16,200  |
| Flexural Modulus (psi)       | 914,000   | 1,149,000 | 1,297,000 | 1,034,000 | 578,000 |
| Izod Impact Strength (ft.lb./in.n.) | 0.8 | 0.7    | 0.5       | 0.7       | 2.9     |
| Deflection Temperature Under Load (F°.) | 233° | 240° | 240° | 243° | 222° |
| Arc Tracking Rate (inch./min.) | 9.4     | 2.23      | 0.0       | 7.0       | 10.6    |

These results are substantially similar to those obtained in Example 1. Again, only the high talc filler composition (Sample H) shows a desirable arc tracking rate. Analogous clay and titanium dioxide filled compositions are wholly unsatisfactory.

EXAMPLE 3

Two thermoplastic compositions are prepared by tumbling 80 parts of polyphenylene ether; 20 parts of triphenyl phosphate; 0.15 part each of zinc oxide and sulfide and 104 parts talc filler. To alternate samples are then added 15 parts of Kraton G-1651 or 1652 resins. These resins are differing molecular weight terblock copolymers having the following common characteristics:

| Endblocks          | polystyrene                             |
|--------------------|-----------------------------------------|
| Midblocks          | hydrogenated butadiene/ ethylene rubber |
| Styrene/rubber ratio | 29/71 by weight                       |

The sample compositions are then processed into molded articles and tested as set forth in Example 1. The results are as follows:

TABLE 3

|                              | Kraton G. 1651 | Kraton G. 1652 |
|------------------------------|----------------|----------------|
| COMPOSITION                  |                |                |
| Molecular Weight             | 175,000        | 53,000         |
| PROPERTIES                   |                |                |
| Tensile Strength (psi)       | 7,300          | 7,200          |
| Flexural Strength (psi)      | 14,300         | 12,000         |
| Flexural Modulus (psi)       | $1,122 \times 10^3$ | $745 \times 10^3$ |
| Izod Impact Strength (ft.lb./in.n.) | .7      | 1.1            |
| Gardner Impact Strength (in.lbs.) | 4         | 8              |
| Deflection Temperature Under Load, (°F.) | 243° | 243°      |
| ARC Tracking Rate (inch/min.) | <1            | <1             |
| Channel Flow                 | 14.0           | 17.5           |

This data reveals the unexpected improvement in physical properties obtained from the present low molecular weight terblock copolymers. Even at low (about 7% by weight) concentration, the differences between the otherwise almost indistinguishable copolymers and their respective sample compositions is evident.

The low molecular weight terblock copolymer provides significant improvements in both Izod and Gardner impact strengths. The molded parts also show increased ductility with little corresponding change in other strengths. In addition, the increase in channel flow indicates that the composition may be molded at lowered temperatures, thus facilitating processing.

All of the foregoing patents and/or publications are incorporated herein by reference. Obviously, other modifications and variations of the present invention are possible in the light of the above teachings. For instance, instead of poly(2,6-dimethyl-1,4-phenylene) ether, there can be used a copolymer such as poly(2,6-dimethyl-co-2,3,6-trimethyl-1,4-phenylene)ether. The compositions can also include other ingredients such as flame retardants, drip retardants, reinforcements and/or fillers, antioxidants, coloring agents, pigments. It is, therefore, to be understood that changes may be made in the particular embodiments of the invention described which are within the full intended scope of the invention as defined by the appended claims.

We claim:

1. A thermoplastic resin composition which comprises an intimate admixture of polyphenylene ether resin with an amount of talc filler effective to provide an UL arc tracking rate of less than 1 inch/minute.

2. A composition as defined in claim 1, wherein the talc filler is at least about 45% by total weight.

3. A composition as defined in claim 1, wherein said composition additionally contains a terblock copolymer with polystyrene endblocks and a rubber midblock.

4. A composition as defined in claim 3, wherein the talc filler is from about 45 to 60% by total weight.

5. A composition as defined in claim 3, wherein the ratio of terblock copolymer to polyphenylene ether resin is from 2:1 to 1:20.

6. A composition as defined in claim 3, wherein the midblock is hydrogenated.

7. A composition as defined in claim 6, wherein the midblock is an ethylene/butadiene midblock.

8. A composition as defined in claim 3, wherein the terblock copolymer has a molecular weight of less than about 100,000.

9. A composition as defined in claim 8, wherein the midblock is a hydrogenated ethylene/butadiene midblock.

10. A composition as defined in claim 9, wherein the terblock copolymer has a molecular weight of between about 30,000 and 80,000.

11. A composition as defined in claim 10, wherein the copolymer has a styrene to rubber weight ratio of about 30:70.

12. A composition as defined in claim 11, wherein the terblock copolymer is from 5 to 25% by composition weight.

13. A composition as defined in claim 12, wherein the total terblock copolymer to polyphenylene ether resin weight ratio is from 2:1 to 1:20.

* * * * *